United States Patent

[11] 3,571,584

[72] Inventor Victor W. Bolie
     Stillwater, Okla.
[21] Appl. No. 835,634
[22] Filed June 23, 1969
[45] Patented Mar. 23, 1971
[73] Assignee Oklahoma State University
     Still Water, Okla.

[54] FUNICULAR DIAGRAM GENERATOR FOR GENERATING AN AUTOMATIC GRAPHICAL DISPLAY OF A FIRST VARIABLE AS A FUNCTION OF A SECOND VARIABLE
4 Claims, 2 Drawing Figs.

[52] U.S. Cl.................................................. 235/197,
                                         235/198, 235/150.53
[51] Int. Cl........................................................ G06g 7/26,
                                                                G06j 1/00
[50] Field of Search............................................ 235/197,
     198, 150.53, 151, 151.1, 151.11, 183; 340/324.1;
                                  315/24, 26; 346/(Inquired)

[56]                 References Cited
               UNITED STATES PATENTS
3,373,273   3/1968   Schubert...................... 235/150.53X
3,513,301   5/1970   Howe............................ 235/150.53
3,524,978   8/1970   Miura et al. .................. 235/150.53X Primary Examiner—Malcolm A. Morrison
Assistant Examiner—Joseph F. Ruggiero
Attorney—Head & Johnson ABSTRACT: This invention provides a funicular diagram generator. More particularly, the invention relates to a funicular diagram generator for use as an interface between a source medium having the form of a stepwise addressable sequential channel output of analogue signal samples and a recording medium in the form of a graph tracer having separate horizontal and vertical analogue deflection signal inputs, the generator providing means of graphically plotting and displaying the analogue signal samples in the form of a continuous funicular diagram consisting of adjacent connected straight-line segments joining adjacent data points having equally spaced abscissas. The funicular diagram generator includes a first and second sample-and-hold circuit means, a summing amplifier receiving the output of the sample-and-hold means, an analogue integrator receiving the output of the summing amplifier and the source medium analogue output signal and a means of sequentially stepping the source medium and the sample-and-hold circuit means in time relationed sequential steps to provide at the output of the analogue integrator a composite signal functioning as the vertical analogue signal which may be impressed on the horizontal and vertical inputs of the graph tracer to provide a funicular diagram display.

INVENTOR.
VICTOR W. BOLIE

BY
Head & Johnson
ATTORNEYS

FUNICULAR DIAGRAM GENERATOR FOR GENERATING AN AUTOMATIC GRAPHICAL DISPLAY OF A FIRST VARIABLE AS A FUNCTION OF A SECOND VARIABLE

CROSS REFERENCE

This disclosure is not related to any pending United States or foreign patent application.

BACKGROUND AND OBJECTS OF THE INVENTION

In many areas of electronic computation and communication there frequently arises a need for generating an automatic graphical display of a first variable Y as a function of a second variable X. This problem is easily solved by two-axis analogue XY-recording methods in the simple case in which both the horizontal and vertical deflection signals are analogue in form. However, a more difficult situation arises when at least one of the two variables originates from a discrete-level or quantized-value source, such as a binary data memory, a digitally coded magnetic tape, or a multichannel analogue signal sampler. In this situation, the two variables to be plotted originate as a sequence of discrete (X, Y) pairs, and some form of automatic numerical interpolation between neighboring (X, Y) pairs is necessary in order to produce a meaningful graphical plot of the data represented by the complete set of (X, Y) pairs.

It is well known that linear, quadratic, cubic, and higher order interpolations between data points can be effected for graphical displays by use of the conventional digital computer. However, in many cases these arithmetic interpolation techniques are wasteful of computing time and do not economically facilitate high-speed cyclic retracing of the graphical plot as needed, for example, in the real-time display of the rapidly varying spectrum of normally voiced speech.

As a solution to this problem it is therefore an object of this invention to provide a properly coordinated system of interconnected electronic modules which will serve as a hybrid interface between an addressable source of analogue signals and a recording medium on which a tracing spot is caused to graphically plot a two-dimensional record of one variable represented as a function of another variable.

Another objective of this invention is to provide a complete electronic system for controlling the horizontal deflection X, the vertical deflection Y, and the tracing-spot blanking signal Z for a two-axis analogue signal plotter, such as a cathode-ray-tube oscilloscope, or an automatic pen recorder.

Another objective of this invention is to provide an electronic system for automatically controlling the address and switching logic to govern the functions of an addressable source of analogue signals such as a multichannel analogue signal sampler, or an electronic core-memory connected in series with a digital-to-analogue converter.

Other objectives and advantages of the invention will become apparent from reference to the specification and claims taken in conjunction with the attached drawings.

DESCRIPTION OF THE VIEWS

FIG. 1 is a block diagram showing an embodiment of the invention as constructed of modular portions providing a circuit for practicing the invention.

FIG. 2 discloses a typical funicular diagram achieved by the invention. The diagram shows a curve displayed on a cathode-ray-tube oscilloscope representative of the source medium stepping through nine channels, it being understood that in many applications the source medium will provide either fewer, or in most cases, a much greater number of channels to be displayed upon the recording medium.

DETAILED DESCRIPTION

In the exposition which follows, it will be assumed that all signals are measured with respect to a common ground bus, and that $E_c$ represents the constant-level voltage of a common supply of positive electrical potential. Also, frequent reference will be made to a single digital pulse, which may typically be assumed as having an amplitude $E_c$, and a duration of approximately 2 microseconds.

SIGNAL INPUTS AND OUTPUTS

Figure 1:
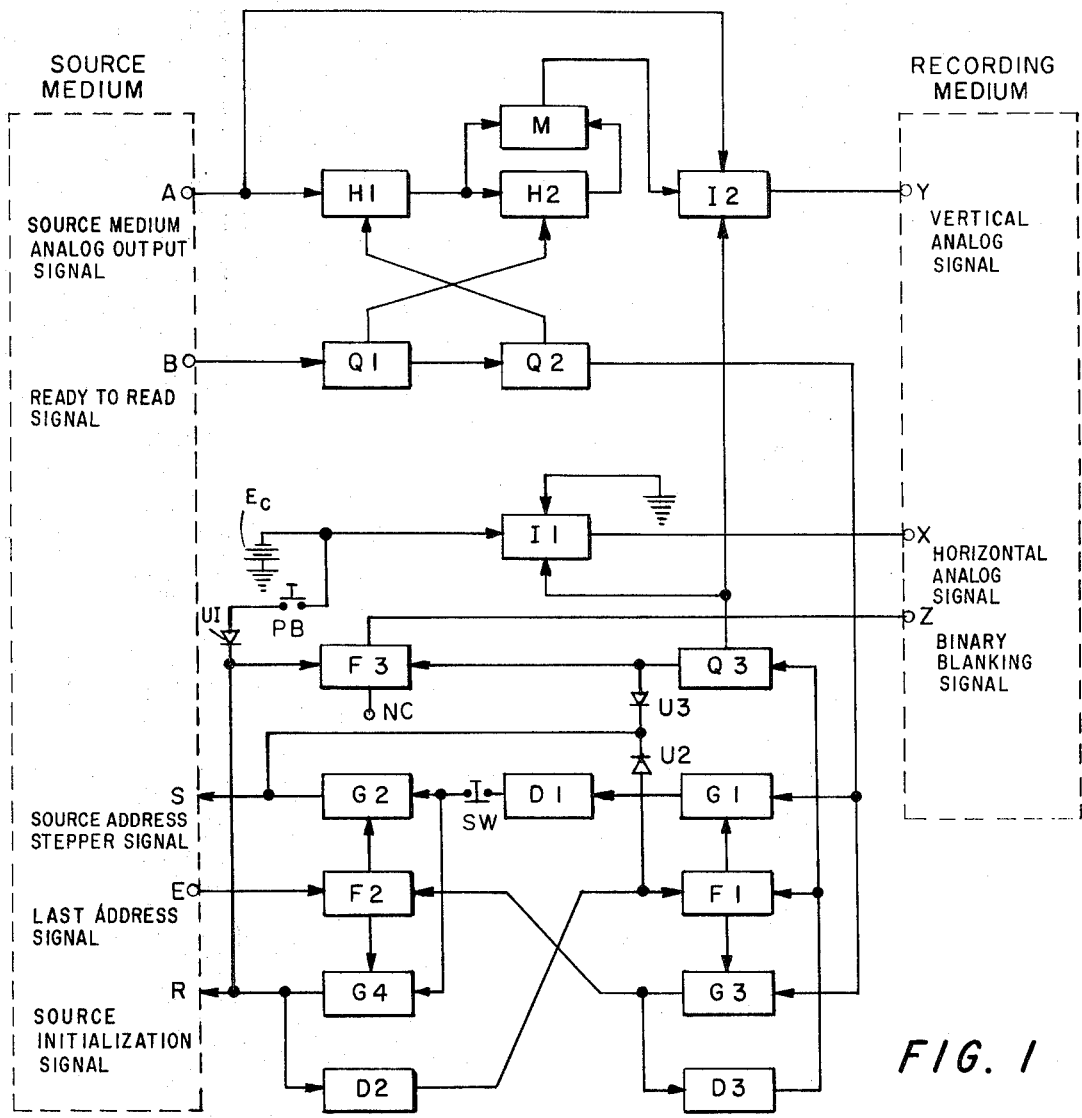

Referring now to FIG. 1, illustrating all the interconnected components of the funicular diagram generator, signals X, Y and Z are coupled to a recording medium, while signals A, B, E, R, and S are coupled to a source medium. Input signal $E_c$ is the fixed voltage of the common supply of electrical energy used to operate the various components of the system. Input signal V is a single digital pulse transmitted as a "start" signal from a manual pushbutton switch PB or any other desired auxiliary source.

Output signal R is a single digital pulse transmitted into the source medium as a "source initialization" signal to reset the address counter of the source medium to its zero initial state. Output signal S is a single digital pulse transmitted into the source medium as a "source address stepper" signal to advance the address counter of the source medium to its next address. Input signal B is a single digital pulse transmitted from the source medium as a "ready to read" signal which arrives shortly after each succeeding source address is commanded by a "source address stepper" pulse S. Input signal A is analogue in form and is equal to the analogue output voltage of the source medium when addressed and read as described above. Input signal E is a single digital pulse transmitted from the source medium as a "last address" signal, which arrives in coincidence with or shortly after the "ready to read" pulse B for the last source address desired in the full scan of sequential addresses.

Output signal voltages X and Y are analogue in form and are, respectively, the horizontal and vertical deflection signals controlling the position of the tracing spot on the planar recording medium on which the funicular diagram is traced. Output signal Z is binary in form, and is equal to zero volts when actual recording by the tracing spot is desired. Thus, the output signal Z may be used as the pen-lift signal for an ink-tracing two axis plotter, or as the blanking signal for a CRT oscilloscope.

COMPONENT MODULES

Referring further to the individual components of the funicular diagram generator illustrated in FIG. 1, units F1, F2, and F3 each represent a bistable element, or flip-flop, of conventional design having separate "set" and "reset" inputs and having separate and complementary "true" and "false" outputs. A single digital pulse arriving at the left input terminal will "set" the unit to the state in which the upper output terminal is maintained at the "true" potential level of $E_c$ volts while the lower output terminal is maintained at the "false" potential level of zero volts. Conversely, a single digital pulse arriving at the right input terminal will "reset" the unit to the opposite state in which the upper output terminal is maintained at the "false" potential level of zero volts while the lower output terminal is maintained at the "true" potential level of $E_c$ volts. The lower output terminal of unit $F_3$, labeled NC for "no connection," is left unused.

Units G1, G2, G3, and G4 each represent a simple signal gate such as an NPN transistor having a grounded emitter, having the gating-control-signal voltage applied to the base through a current-limiting resistance, having the transmissible signal voltage applied to the collector through another current-limiting resistance, and having the output signal voltage taken directly from the collector. The gating control signals for gates G1 and G3 are obtained, respectively, from the upper and lower output terminals of bistable element F1, so that after a single digital pulse is applied to the left input to F1 gate G3 will transmit and gate G1 will block. Conversely, after a single digital pulse is applied to the right input to F1 gate G3 will block and gate G1 will transmit. By means of similar connections gates G2 and G4 are operated in a similar manner by the bistable element F2. Thus, when the transmissible signal inputs to gates G1 and G3 are connected in parallel, the G1-F1-G3 combination serves as a high-speed all-electronic single-pole double-throw switch. This same type of switching function is performed independently by the G2-F2-G4 combination when the transmissible signal inputs to gates G2 and G4 are connected in parallel.

Units U1, U2, and U3 are conventional diodes which permit only unidirectional transmission of the positively polarized digital pulses. Units D1, D2, and D3 are simple pulse delay units of standard configuration, each of which is designed to receive an input signal in the form of a single digital pulse and to respond to this input by generating an output signal in the form of another single digital pulse, with provision for an adjustably fixed time lapse between receipt of the input pulse and generation of the output pulse. Delay units D2 and D3 are each adjusted to produce the least possible delay, e.g., 10 microseconds, compatible with the proper functioning of the other components of the system. Delay unit D1 is adjusted to produce the delay time interval desired for the particular recording medium to be used, e.g., 300 microseconds for a CRT oscilloscope presentation, or 20 milliseconds if the funicular diagram is to be recorded by means of a two-axis analogue signal plotter.

Units I1 and I2 are analogue signal integrators of conventional design, each including the provision for electronically resetting its initial condition to a separately controllable voltage level. Such a component is commercially available as the Model 1663 Switched Integrator, manufactured by the Burr-Brown Research Corporation, Tucson, Arizona. In FIG. 1, units I1 and I2 are each shown with three inputs and one output. The left input receives the analogue signal to be integrated. The lower input receives an "initial-condition reset" command in the form of a rectangular voltage pulse of somewhat extended duration, e.g., 100 microseconds. The upper input receives the "reset level" signal which governs the level to which the analogue output voltage is equated by means of the reset command. In accord with the signal polarities of the conventional electronically resettable integrator, it is important to note that during the integration process the output voltage decreases at a rate which is algebraically proportional to the input voltage, and that the initial-condition reset process equates the output voltage to the algebraic negative of the applied "reset level" signal voltage.

Each of the units H1 and H2 is a sample-and-hold circuit having an analogue input, a digital input, and an analogue output. The left input receives an analogue signal voltage continuously. The lower input receives a "sample-and-hold" command in the form of a rectangular voltage pulse of moderate duration, e.g., 5 microseconds. In the absence of a "sample-and-hold" command, the analogue output signal remains constant. When a "sample-and-hold" pulse is applied to the lower (digital) input terminal, the analogue output signal is suddenly changed from its previous level to a new constant level. The new level is equal to the algebraic negative of the analogue input signal voltage existing at the moment the "sample-and-hold" pulse is terminated. Such a sample and hold circuit is available commercially as the Model 1673 Sample and Hold Module manufactured by the Burr-Brown Research Corporation, Tucson, Arizona.

Unit M is a summing amplifier of conventional design, having two analogue inputs and one analogue output. The internal feedback resistance and input resistances are chosen so that the output signal voltage is equal to the algebraic negative of half the algebraic sum of the two input signal voltages.

Finally, each of the units Q1, Q2, and Q3 shown in FIG. 1 is a "composite timer circuit" having one digital input and two digital outputs. The composite circuit consists of two distinct subcircuits which are functionally connected in series. The first subcircuit is that of a conventional monostable multivibrator which is triggered by a single digital pulse applied to the input terminal to generate a rectangular pulse of adjustable duration, e.g., 5 to 308 microseconds. The second subcircuit is essentially equivalent to that of a conventional pulse delay circuit which is activated by the trailing edge of the rectangular pulse generated by the monostable multivibrator. The output of this pulse-delay subcircuit is a single digital pulse which occurs after the termination of the rectangular pulse excursion of the monostable multivibrator by a small but definite time lapse, e.g., 5 microseconds. In each of the units Q1, Q2, and Q3 the upper output terminal is excited by the rectangular pulse emanating from the respective monostable multivibrator subcircuit, and the remaining output terminal is excited by the single digital pulse emanating from the respective pulse-delay subcircuit. Thus, each of the units Q1, Q2, and Q3 has the capability of responding to a single digital pulse input in a way which definitely assures completion of a first signalling function (emission of a fully completed rectangular pulse from the upper output terminal) prior to generating a termination signal (emitted as a single digital pulse from the other output terminal).

OPERATING PRINCIPLES OF THE INVENTION

From the foregoing description, it is apparent that the funicular diagram generator is a composite hybrid system which receives and generates both analogue and digital signals. The principles by which the system operates will be discussed with reference to FIG. 1.

The basic scheme of operation is that the analogue output voltage X which drives the horizontal deflection of the tracing spot on the recording medium, is a ramp-function signal voltage which decreases linearly with time. It is assumed that the polarity of the connected recording medium is such that this linearly decreasing deflection voltage X drives the tracing spot from left to right. The vertical deflection voltage Y for the tracing spot is intended to be a sequence of linearly increasing or decreasing signal voltages which sequentially cause the tracing spot to graphically join adjacent data points with straight-line segments. The resulting funicular diagram drawn by the tracing spot on the recording medium is thus a set of points which are equally spaced in the horizontal direction and which are sequentially interconnected by a series of straight-line segments. The basic system provides for automatic resetting of the tracing spot and retracing of the funicular diagram on the recording medium, so that a continuous display of the funicular diagram can be visualized when the recording medium has only a very brief retention of the trace, as in the case with a cathode-ray-tube oscilloscope.

Referring now to FIG. 1, let it be assumed initially that the system has been inoperative, as would be the case if the output of delay unit D1 had been temporarily disconnected, such as by means of opening normally closed switch SW, that the tracing spot on the recording medium is located at an arbitrary position, and that the data address of the analogue signal source medium is arbitrary.

The system is brought into self-controlled operation from this initially inoperative state by application of a single digital pulse V through diode U1. This "system start" pulse performs the three functions of (1) triggering flip-flop F3 into the state which produces a "true" blanking signal Z, (2) delivering a "-source initialization" signal R which resets the address counter of the source medium to its zero initial state, and (3) triggering the activation of delay unit D2.

The next event, which occurs typically 10 microseconds later, is the appearance of a single digital pulse generated as an output signal from delay unit D2. This delayed pulse performs the two functions of (1) "setting" flip-flop F1 to the state which causes gate G1 to block and gate G3 to transmit, and (2) delivering through diode U2 a "source address stepper" signal S which advances the address counter of the source medium to that of the first channel to be sampled.

The next event, which occurs typically 10 microseconds later, is the arrival of a "ready to read" signal pulse B from the source medium to activate composite timer circuit Q1. Composite timer circuit Q1 then immediately transmits its rectangular "sample-and-hold" output pulse, to cause sample-and-hold unit H2 to equate its analogue output to the algebraic negative of its analogue input, and to hold this new output thereafter. Composite timer circuit Q1 then transmits, after a brief but definite time lapse of typically 5 microseconds, a single digital pulse output to activate composite timer circuit Q2.

Composite timer circuit Q2 immediately responds by transmitting its rectangular "sample-and-hold" output pulse, to cause sample-and-hold unit H1 to equate its analogue output to the algebraic negative of its analogue input, and to hold this new output thereafter. Composite timer circuit Q2 then transmits, after a similarly brief but definite time lapse of typically 5 microseconds, a single digital pulse output into gates G1 and G3. At this time the output of sample-and-hold unit H1 is being held at a voltage level equal to the algebraic negative of the signal voltage output of channel-one of the source medium, and it is safe to initiate the next events of resetting the X- and Y-integrators, releasing the blanking signal Z, and stepping the source medium to channel-two.

Since the previous setting of flip-flop F1 permits only gate G3 to transmit, the parallel pulse inputs to gates G1 and G3 from composite timer circuit Q2 result only in a single digital pulse output from gate G3. This single digital pulse output from gate G3 performs the two functions of (1) "resetting" flip-flop F2 to the state which causes gate G4 to block and gate G2 to transmit, and (2) triggering the activation of delay unit D3.

The next event, which occurs typically 10 microseconds later, is a single digital pulse output from delay unit D3 which simultaneously (1) "resets" flip-flop F1 to the state which causes gate G3 to block and gate G1 to transmit, and (2) activates composite timer circuit Q3. Composite timer circuit Q3 immediately responds by transmitting its rectangular "sample-and-hold" output pulse, to cause both of the integrators I1 and I2 to reset their outputs X and Y to their respective initial-condition levels. Upon completion of this event, the horizontal deflection signal X is at its initial zero-level voltage and the vertical deflection signal voltage Y is equal to the algebraic negative of the signal voltage output of channel-one of the source medium. Composite timer circuit Q3 then transmits, after a brief but definite time lapse of typically 5 microseconds, a single digital pulse output which performs the two functions of (1) "resetting" flip-flop F3 back to the condition which maintains the output signal Z at the "false" potential level of zero volts, and (2) delivering through diode U3 a "source address stepper" signal S which advances the address counter of the source medium to that of the second channel to be sampled.

The next event, which occurs typically 10 microseconds later, is the arrival of a "ready to read" signal pulse B from the source medium, to again activate composite timer circuit Q1. Composite timer circuits Q1 and Q2 then sequentially respond, in the manner previously described, after which the output signal voltage of sample-and-hold unit H1 is equal to the algebraic negative of the signal voltage output of channel-two of the source medium, and the output signal voltage of sample-and-hold unit H2 is, with the algebraic sign reversal taken into consideration, equal to the previously sampled signal voltage output of channel-one of the source medium.

Following these responses of composite timer circuits Q1 and Q2, the single digital pulse output from Q2 is transmitted through gate G1 to activate delay unit D1. The next event, which occurs typically 300 microseconds later for the case in which the recording medium is a CRT oscilloscope, is the appearance of a single digital pulse generated as an output signal from delay unit D1. During this rather deliberately extended time lapse carried by delay unit D1, the summing amplifier M has, with the algebraic sign reversal taken into consideration an analogue output signal voltage level equal to the channel-two voltage minus the channel-one voltage retained from the previous sampling of the source medium. Integrator I2 responds by decreasing its output signal voltage Y away from its automatically preset initial level at a rate which is algebraically proportional to the analogue signal voltage output of summing amplifier M. Thus, if the channel-one signal from the source medium is a voltage $A_1$, and the channel-two signal from the source medium is another voltage $A_2$, the initial voltage output $Y_0$ from integrator I2 will be $$Y_0 = -A_1 ,$$

and very shortly thereafter the vertical deflection signal Y will obey the equation $$Y = -A_1 - (A_2 - A_1) KT ,$$

in which T is the time measured from the moment after composite timer circuit Q2 emits its single digital output pulse, and in which K is a constant of proportionality.

The constant of proportionality K for integrator I2 is chosen to be such that $Kt = 1$, where $t$ is essentially equal to the time lapse of delay unit D1. As a result of this proportionality the vertical deflection voltage Y will be at the level $y = -A_2$ when $T = t$. Also, during the time interval $0 \leq T \leq t$, the analogue output signal voltage $X$ from integrator I1 decreases at a rate which is proportional to the fixed-level voltage $E_c$, in accord with the equation $$X = -K'T ,$$

in which K′ is another constant of proportionality, chosen to given an increment $K't$ of horizontal deflection voltage appropriate to the horizontal extent of the desired funicular diagram. Since flip-flop F3 is in the state which does not blank the tracing spot in the recording medium, the first straight-line segment of the funicular diagram is automatically plotted during the time interval $0 \leq T \leq t$.

At the end of the first extended time interval, i.e., when $T = t$, the single digital pulse output from delay unit D1 is transmitted through gate G2 as a "source address stepper" pulse S which advances the address counter of the source medium to that of the third channel to be sampled. The source medium, after utilizing the brief time interval of typically 10 microseconds to fully establish the new sampling address for the third channel, emits its usual "ready to read" signal pulse B into composite timer circuit Q1. As a result, the output of sample-and-hold unit H1 is quickly made equal to the algebraic negative of the channel-three voltage $A_3$, the output of sample-and-hold unit H2 is quickly made equal to the channel-two voltage $A_2$ and the recording medium is caused to trace the next straight-line segment of the funicular diagram during the second extended time interval of typically 300 microseconds permitted by delay unit D1.

The above-described interim sequence of events is automatically repeated in stepwise fashion for all of the remaining channels of the source medium, with the exception that shortly after the "source address stepper" pulse S is transmitted to step the source medium to its last-channel address, the source medium not only emits its usual "ready to read" pulse B, but also emits its "last address" signal pulse E. This "last address" signal pulse E "sets" flip-flop F2 to the condition causing gate G2 to block and gate G4 to transmit. Consequently, as soon as the last straight-line segment of the funicular diagram is traced by the recording medium the usual digital pulse output from delay unit D1 is diverted through gate G4 to automatically restart the entire sequence of events originally initiated by the "start" signal pulse V.

Figure 2:
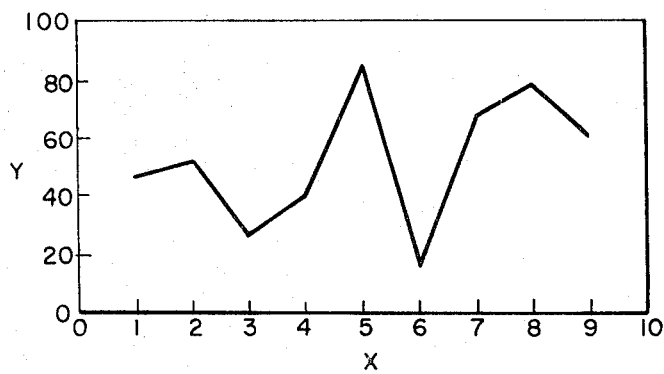

Thus, the system illustrated in FIG. 1 automatically controls the source medium and the recording medium, and utilizes the appropriate analogue and digital signals to cause the recording medium to continually retrace a funicular diagram of the type shown in FIG. 2, which illustrates in the form of a graphical display the set of analogue signal levels presented sequentially by the source medium. It will be seen that the accuracy of the funicular diagram in graphically representing the source data will be enhanced if (1) the response time of the source medium as measured by the interval between receipt of a "source address stepper" pulse S and the emission of a "ready to read"

pulse B is uniformly constant for all the channels, and (2) the sum of the response times of the source medium and composite timer circuits Q1 and Q2, totaling typically 30 microseconds, is small compared to the response time of delay unit D1.

The total time required for one complete trace of the funicular diagram and the automatic start of the next trace depends on the number of channels desired in the source medium and on the time required to reset integrators I1 and I2. Thus, if the response times of the source medium and of composite timer circuits Q1 and Q2 are each 10 microseconds, and the response time of delay unit D1 is 300 microseconds, then for a source medium of 100 channels the total tracing time including automatic restart would be 33.333 milliseconds. This results in a trace repetition rate of 30 retraces per second. Slower tracing rates can easily be achieved by simply extending the response time of delay unit D1. A source medium of a type suitable for use with the funicular diagram generator system described herein is commercially available as the Model 765 Multiplexer, manufactured by the Electronic Engineering Company, Anaheim, California.

ALTERNATE ARRANGEMENTS

Many modifications of the funicular diagram generator system illustrated in FIG. 1 and described above may be foreseen without departing from the essential concepts of this invention. For example, if the integrator I2 is one which provides for two identical gain constants for two separate analogue inputs, summing amplifier M can be eliminated by connecting its two analogue inputs directly into integrator I2, and by connecting the upper input terminal of integrator I2 to receive its "reset level" signal directly from the output of sample-and-hold unit H1.

Another obvious modification of the system is the addition of a 2-pole, multiple-position, switch to permit rapid setting of the gain constants of integrators I1 and I2 to paired values which are compatibly indexed with the number of channels desired for the source medium. Still another obvious modification of this invention is the replacement of integrator I1 with a network equivalent to that embodied by integrator I2, sample-and-hold units H1 and H2, summing amplifier M, and composite timer circuits Q1 and Q2; this modification would allow the system to produce a linear interpolation between successive X-data points as well as between the successive Y-data points, such as might be desired for cases in which the source medium generates a succession of simultaneous (X,Y)-pairs of data points.

Another clearly foreseeable modification of the system is the functional interruption of the automatic trace-restart provision by disconnecting the output of gate G4 from its indicated former connections with other parts of the system; this modification would make it possible for a single trace of the funicular diagram to be individually initiated by the "system start" pulse V, and would permit the usual "trace-restart" pulse output from gate G4 to be used to initiate any other desired extraneous function. Still another naturally foreseeable modification of the present invention is that in which the recording medium is replaced with a two-dimensional position or velocity control unit, such as an electrically controllable milling machine.

I claim:

1. A funicular diagram generator for use as an interface between a source medium having the form of a stepwise addressable sequential channel output of analogue signal samples and a recording medium in the form of a graph tracer having separate horizontal and vertical analogue deflection signal inputs, the generator providing means of graphically plotting and displaying said analogue signal samples in the form of a continuous funicular diagram consisting of adjacently connected straight-line segments joining adjacent data points having equally spaced abscissas, said diagram generator comprising:

a first and second sample-and-hold circuit means each having an analogue signal output, an analogue signal input, and a sample-and-hold command signal input, the analogue signal input of said first sample-and-hold circuit being connected to said source medium analogue signal output;

a summing amplifier having a first and second analogue signal input and a summation signal output, the internal feedback resistance and input resistances of said summing amplifier being such that the summation signal output is equal to the algebraic negative of one-half of the algebraic sum of the two analogue input signals, the output of said first sample-and-hold circuit means being connected to said first summing amplifier signal input and in like manner, the output of said second sample-and-hold circuit means being connected to said second summing amplifier input, the output of said first sample-and-hold circuit means being also connected to said second sample-and-hold circuit analogue input;

an analogue integrator having an analogue signal input connected to the output of said summing amplifier, an initial condition reset signal input, a reset level signal input connected to said source analogue signal output, and an integrated signal output connected to said graph tracer vertical signal input;

means of sequentially stepping said source medium to provide at each channel a sample analogue signal to said first sample-and-hold circuit and simultaneously to said analogue integrator analogue signal input;

means of sequentially imparting the analogue signal sample held by said first sample-and-hold circuit to said summing amplifier and concurrently imparting the analogue signal sample held by said second sample-and-hold circuit to said summing amplifier whereby the output of said summing amplifier is the algebraic negative of one-half of the algebraic sum of the two said input analogue signals;

means of actuating said analogue integrator to provide at the output thereof an analogue vertical deflection signal which changes away from its automatically preset initial level at a rate which is algebraically proportional to the analogue signal voltage of said summing amplifier which said analogue signal output is fed to said recording medium vertical deflection input;

means of applying a linearly changing analogue deflection signal to said recording medium horizontal input in synchronization with the sequential stepping of said source medium; and means following the actuation of said analogue integrator to transfer the analogue signal held by said first sample-and-hold circuit to said second sample-and-hold circuit and subsequently to step said source medium to the next adjacent sequential channel to provide at said summing amplifier output, for each channel, an analogue signal voltage level equal to the algebraic negative of one-half the algebraic sum of that channel step sampled analogue signal voltage plus the analogue signal voltage of the sampled preceding channel step.

2. A funicular diagram generator according to claim 1 wherein said recording medium includes a blanking signal input and including means providing a blanking signal thereto in synchronization with said means of sequentially stepping said source medium.

3. A funicular diagram generator according to claim 1 wherein said source medium includes an address stepper signal input and wherein said means of sequentially stepping said source medium includes means providing a digital stepper signal in synchronization with and in time governed relationship to said means of actuating said analogue integrator to provide said vertical deflection signal.

4. A funicular diagram generator according to claim 1 wherein said source medium includes a ready to read signal output providing a digital signal as said source medium is conditioned to each succeeding channel and including: sequential time delay circuit means actuated by said ready to read signal from said source medium, said sequential time delay circuit means including means of sequentially providing digital signal inputs to said sample-and-hold command signal inputs to cause said sample-and-hold circuit means to actuate in time spaced synchronization with the sequential advancement of said source medium.